US012339229B2

(12) United States Patent
Deissler et al.

(10) Patent No.: US 12,339,229 B2
(45) Date of Patent: Jun. 24, 2025

(54) METHOD OF ANALYZING A MIXED FLUORESCENCE RESPONSE OF A PLURALITY OF FLUOROPHORES, FLUORESCENCE ANALYZER, FLUORESCENCE MICROSCOPE AND COMPUTER PROGRAM

(71) Applicant: LEICA MICROSYSTEMS CMS GMBH, Wetzlar (DE)

(72) Inventors: Benjamin Deissler, Wetzlar (DE); Christian Schumann, Wetzlar (DE); Kai Ritschel, Wetzlar (DE); Mate Beljan, Wetzlar (DE); Wernher Fouquet, Wetzlar (DE); Gheorghe Cojoc, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 221 days.

(21) Appl. No.: 17/994,434

(22) Filed: Nov. 28, 2022

(65) Prior Publication Data
US 2023/0175963 A1   Jun. 8, 2023

(30) Foreign Application Priority Data

Dec. 6, 2021   (EP) .................................. 21212550

(51) Int. Cl.
*G01N 21/64* (2006.01)

(52) U.S. Cl.
CPC ....... *G01N 21/64* (2013.01); *G01N 2201/127* (2013.01)

(58) Field of Classification Search
CPC ............. G01N 21/64; G01N 2201/127; G01N 21/6428; G01N 21/6458; G01N 2021/6441; G02B 21/367; G02B 21/16; G01J 3/4406
See application file for complete search history.

(56) References Cited

U.S. PATENT DOCUMENTS

| 6,687,000 B1 | 2/2004 | White |
| 2005/0179892 A1 * | 8/2005 | Gerstner .............. G02B 21/008 356/318 |

(Continued)

FOREIGN PATENT DOCUMENTS

| EP | 3721279 B1 | 9/2021 | |
| WO | WO-2015044419 A1 * | 4/2015 | ........... G06K 9/0014 |
| WO | WO 2021185557 A1 | 9/2021 | |

OTHER PUBLICATIONS

T. Zimmermann: "Spectral Imaging and Linear Unmixing in Light Microscopy," Adv Biochem Engin/Biotechnol, Springer-Verlag, Germany, Jan. 2005, pp. 245-265.

(Continued)

*Primary Examiner* — David P Porta
*Assistant Examiner* — Mamadou Faye
(74) *Attorney, Agent, or Firm* — LEYDIG, VOIT & MAYER, LTD.

(57) ABSTRACT

A method of analyzing a mixed fluorescence response of a plurality of fluorophores in a microscopic sample includes reconstructing individual fluorescence responses from a mixed fluorescence response using spectral un-mixing based on reference emission spectra for fluorophores to be reconstructed, and a procedure for determining and validating reference emission spectra including providing a plurality of image acquisition settings for a sequence of images of the sample equal to, or greater than, the plurality of fluorophores and including an illumination setting for each image, acquiring the sequence of images using the plurality of image acquisition settings and storing each image together with the corresponding illumination setting, determining candidate reference emission spectra for the fluorophores to be reconstructed from the sequence of images of the sample using one or more reference emission spectra determination algo- (Continued)

rithms, and conditionally using the candidate reference emission spectra as the reference emission spectra in the spectral un-mixing.

18 Claims, 5 Drawing Sheets

(56) References Cited

U.S. PATENT DOCUMENTS

| | | |
|---|---|---|
| 2005/0243313 A1 | 11/2005 | Neher et al. |
| 2021/0165198 A1 | 6/2021 | Mueller-Rentz et al. |
| 2021/0208076 A1 | 7/2021 | Chang et al. |

OTHER PUBLICATIONS

McRae Tristan D. et al.: "Robust blind spectral unmixing for fluorescence microscopy using unsupervised learning," bioRxiv, US, Oct. 9, 2019, pp. 1-40.

Huang Shaosen et al.: "Nonnegative matrix factorization using target-to-background contrast for fluorescence unmixing," IEEE, US, Oct. 2013, pp. 287-292.

Murad Megjhani et al.: "Morphologically constrained spectral unmixing by dictionary learning for multiplex fluorescence microscopy," Bioinformatics, Oxford University Press, UK, Mar. 2, 2017, pp. 2182-2190.

Pu Yang et al.: "Evaluation of algorithm methods for fluorescence spectra of cancerous and normal human tissues," Proc. of SPIE vol. 9703, SPIE, US, Jun. 6, 2016, pp. 97031M-1-97031M-9.

Jerilyn A. Timlin: "Imaging multiple endogenous and exogenous fluorescent species in cells and tissues," Proc. of SPIE vol. 6088, SPIE, US, Jan. 2006, pp. 608805-1-608805-10.

James R. Mansfield et al.: "Autofluorescence removal, multiplexing, and automated analysis methods for in-vivo fluorescence imaging," Journal of Biomedical Optics 10(4), Aug. 2005, SPIE, US, pp. 041207-1-041207-9.

Sebastian Malkusch et al: "Coordinate-based colocalization analysis of single-molecule localization microscopy data", Histochemistry and Cell Biology, Springer, Berlin, DE, vol. 137, No. 1, Nov. 16, 2011 (Nov. 16, 2011), pp. 1-10, XP819996884.

Bateson, Ann and Brian Curtiss, "A Method for Manual Endmember Selection and Spectral Unmixing," Remote Sens. Environ. 55:229-243, Mar. 1996, Elsevier Science Inc., US.

* cited by examiner

METHOD OF ANALYZING A MIXED FLUORESCENCE RESPONSE OF A PLURALITY OF FLUOROPHORES, FLUORESCENCE ANALYZER, FLUORESCENCE MICROSCOPE AND COMPUTER PROGRAM

CROSS REFERENCE TO RELATED APPLICATIONS

This application claims benefit to European Patent Application No. EP 21212550.4 filed on Dec. 6, 2021, which is hereby incorporated by reference herein.

FIELD

The present invention relates to a method of analyzing a mixed fluorescence response of a plurality of fluorophores in a microscopic sample, as well as to a fluorescence analyzer, to a fluorescence microscope and to a computer program.

BACKGROUND

WO 2021/185557 A1 discloses a fluorescence microscope for imaging an object including different fluorophores having distinct spectral emission characteristics. The fluorescence microscope comprises an optical system configured to collect fluorescent light emitted from the different fluorophores within a field of view to focus the fluorescent light for detection. A spectral splitting arrangement configured to split the fluorescent light collected within the field of view into at least two spectrally different fluorescent light components is provided. A multi-channel detector system comprising at least two image sensors is configured to detect at least two spatial light intensity distributions based on the at least two spectrally different fluorescent light components, wherein each spatial light intensity distribution represents an image of the object over the field of view. The fluorescence microscope further comprises a processor configured to determine spatial distributions of the different fluorophore species based on a spectral un-mixing analysis of each spatial light intensity distribution.

SUMMARY

In an embodiment, the present disclosure provides a method of analyzing a mixed fluorescence response of a plurality of fluorophores in a microscopic sample, wherein the mixed fluorescence response comprises contributions of individual fluorescence responses of each of the plurality of fluorophores, the method comprising reconstructing the individual fluorescence responses from the mixed fluorescence response using a spectral un-mixing on the basis of reference emission spectra for the fluorophores to be reconstructed, and wherein the method includes a procedure for determining and validating the reference emission spectra including the steps of providing a plurality of image acquisition settings for a sequence of images of the sample equal to, or greater than, the plurality of fluorophores and including an illumination setting for each image of the sequence of images, acquiring the sequence of images of the sample using the plurality of image acquisition settings and storing each image of the sequence of images of the sample together with the corresponding illumination setting, determining candidate reference emission spectra for the fluorophores to be reconstructed from the sequence of images of the sample using one or more reference emission spectra determination algorithms, and conditionally using the candidate reference emission spectra as the reference emission spectra in the spectral un-mixing.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Embodiments of the present invention improve the process of spectral un-mixing in conventional systems and any other fluorescence microscopes and similar devices in which fluorescence responses of a plurality of fluorophores are analyzed, particularly in terms of effectiveness and user friendliness.

A method of analyzing a mixed fluorescence response of a plurality of fluorophores in a microscopic sample is provided, wherein the mixed fluorescence response comprises contributions of individual fluorescence responses of each of the plurality of fluorophores, wherein the method includes reconstructing said individual fluorescence responses from the mixed fluorescence response using a spectral un-mixing on the basis of reference emission or endmember spectra for the fluorophores to be reconstructed.

Said method comprises a procedure for determining and validating the reference emission spectra including (a) providing a plurality of image acquisition settings for a sequence of images of the sample equal to, or greater than, the plurality of fluorophores and including an illumination setting for each of the sequence of images, (b) acquiring the sequence of images of the sample using the plurality of image acquisition settings and storing each of the sequence of images of the sample together with the corresponding illumination setting, (c) determining candidate reference emission spectra for the fluorophores to be reconstructed from the sequence of images of the sample using one or more reference emission spectra determination algorithms, and (d) conditionally using said candidate reference emission spectra as the reference emission spectra in said spectral un-mixing.

The method proposed according to embodiments of the present invention enables a reliable determination of the reference emission spectra used for spectral un-mixing of fluorescence images. This is achieved with minimal user intervention, by automatically acquiring the necessary images, performing the spectral determination, optionally checking the spectral determination for plausibility, and optionally giving a feedback to the user regarding the outcome of the spectral determination. The method can be performed directly on the sample that is to be imaged afterwards, so that no additional reference samples are needed.

In an embodiment of the present invention, the method includes the further step of (i) performing a plausibility check for the candidate reference emission spectra between steps (c) and (d) indicated above, a result of the plausibility check indicating whether or not the candidate reference emission spectra are plausible for the fluorophores to be reconstructed, and the further step of (ii) using said candidate reference emission spectra as the reference emission spectra in said spectral un-mixing according to step (d) indicated above if a result of the plausibility check is positive, or rejecting said candidate reference emission spectra if the plausibility check is negative. Said plausibility check ensures, in an embodiment of the present invention, that only valid reference emission spectra are further used; i.e. if a candidate reference emission spectrum is found to be not valid, this can be dropped and e.g. a default or previous reference endmember spectrum can be used instead.

The illumination settings may, in an embodiment of the present invention, be linearly independent. If illumination settings are represented as a matrix with one illumination setting per column and the respective intensity per line, linearly independence is expected to be present. This is the case for a diagonal matrix when individually activated light sources are used, but can also be the case when several light sources are activated. Embodiments of the invention are therefore universally and flexibly applicable for these different cases.

The illumination setting for each of the sequence of images may, according to an embodiment of the invention, include a selection of a single light source among a plurality of light sources, the single light source including a light emitting diode, a laser of a given centre wavelength, or a wavelength selection device which may particularly be configured to select a (contiguous) illumination spectrum from a broadband light source, e.g. selected from a classical filter, an acousto-optical filter or selection device, and a spectrometer. Embodiments of the present invention are thus usable in a large number of different types of fluorescence microscopy techniques.

Generally, according to an embodiment of the present invention, the procedure for determining and validating the reference emission spectra may be performed in at least two instances in time including a previous and a subsequent instance. This allows for (re-)using results previously obtained in a subsequent instance of the procedure.

Performing the plausibility check in the subsequent instance may include, according to an embodiment of the present invention, performing an evaluation on the basis of reference emission spectra acquired in the previous instance. According to an embodiment of the present invention, when said result of performing the plausibility check is positive in the previous instance, said candidate reference emission spectra may be stored for use in said plausibility check in said subsequent instance. Particularly, in such an embodiment, a gradual improvement from instance to instance becomes possible.

Such a gradual improvement of results, or an advantageous (re-)use of results, particularly becomes possible if, according to an embodiment of the present invention, settings used in the subsequent instance are based on the illumination settings used in the previous instance when the plausibility check was positive in the previous instance.

The image acquisition settings may include, according to embodiments of the present invention, detector or camera settings selected on the basis of sample properties, the sample properties including at least one of a motility or sensitivity of the sample and the detector or camera settings including at least one of a binning factor, a scan speed, a scan resolution, a gain value and an exposure time. That is, in such embodiments, settings may be specifically adapted to more or less mobile or sensitive samples, thus improving the results while particularly protecting sensitive samples.

In embodiments of the present invention, the mixed fluorescence response may be determined using a fluorescence microscope, wherein the fluorescence microscope is a fluorescence microscope configured to be operated in at least one microscopy mode selected from a wide-field mode, a confocal mode, and a light sheet mode, and wherein the procedure for determining and validating the reference emission spectra is performed for at least one of said microscopy modes. Embodiments of the present invention, therefore, allow flexibly operating multiple modes of one single instrument.

The procedure for determining and validating the reference emission spectra may, according to an embodiment of the present invention, be performed as a response to a calibration request, wherein the calibration request may be at least one of a calibration request issued by a user, a calibration request issued on the basis of a result of an image analysis step, a calibration request issued on the basis of a predefined point in time and a calibration request issued when a change of a field of view is determined. That is, embodiments of the present invention allow for a regular (re-)calibration or a (re-)calibration on an on-demand basis and therefore to obtain improved analysis results.

Particularly, and in an embodiment of the invention, said calibration request may be issued when the image analysis indicates that a number of adjacent pixels in a predetermined intensity range and/or a value corresponding to a correlation coefficient calculated between unmixed images is above a predetermined threshold. A reliable and automatic determination, therefore, may be used to determine when a (re-)calibration is necessary.

In embodiments of the present invention, a user feedback to a user may be issued and/or the user may be offered the possibility of using default reference emission spectra. This allows the involvement of the expertise of a, typically knowledgeable, user.

Said one or more reference emission spectra determination algorithms may include, in embodiments of the present invention, at least one of an N-FINDR algorithm, a pixel purity index, a nonnegative matrix or tensor factorization, a vertex or principle component analysis, a trained neural network, and an optimization algorithm. Such algorithms may be used alone or in combination and are particularly advantageous to obtain reliable results.

According to an embodiment of the present invention, reference excitation spectra may be provided and used in determining the candidate reference emission spectra.

In an embodiment of the present invention, the plausibility check for the candidate reference emission spectra may include determining at least one of a Euclidean distance from given reference emission spectra, a spectral angle with given reference emission spectra and a non-negativity for the candidate reference emission spectra. According parameters are particularly suitable to determine a similarity to an expected or reference value and therefore to evaluate a validity of the spectra.

In a further embodiment of the present invention, said plausibility check may include comparing plausibility values with plausibility thresholds, wherein said plausibility thresholds are different for said fluorophores. This allows for considering each fluorophore and its specific properties individually and appropriately.

Said un-mixing may, in an embodiment of the present invention, include at least one of linear un-mixing, phasor un-mixing, determining a maximum-likelihood estimator or a combination thereof. Such methods are particularly suitable un-mixing methods and the method used may be selected to preferably match the specific analysis situation.

A value indicating a deviation of the candidate reference emission spectra from an expected value may be used to derive a sample property, according to an embodiment of the present invention. Therefore, embodiments of the present invention not only allow for an advantageous (re-)calibration for spectral un-mixing, but also to determine sample properties such as an acidity by using the same method.

According to embodiments of the present invention, a number of the fluorophores and their spectra may be derived from the mixed fluorescence response. This allows analyzing unknown samples where the number of fluorophores and their spectra is not known.

A fluorescence analyzer configured for analyzing a mixed fluorescence response of a plurality of fluorophores in a microscopic sample is also provided, wherein said mixed fluorescence response comprises contributions of individual fluorescence responses of the plurality of fluorophores. Said analyzing comprises reconstructing said individual fluorescence responses from the mixed fluorescence response using spectral un-mixing on the basis of reference emission spectra for the fluorophores to be reconstructed. The fluorescence analyzer is configured for, as a response to a calibration request, performing a procedure for determining and validating the reference emission spectra including (a) providing a plurality of image acquisition settings for a sequence of images of the sample equal to, or greater than, the plurality of fluorophores and including an illumination setting for each of the sequence of images, (b) acquiring the sequence of images of the sample using the plurality of image acquisition settings and storing each of the sequence of images of the sample together with the corresponding illumination setting, (c) determining candidate reference emission spectra for the fluorophores to be reconstructed from the sequence of images of the sample using one or more reference emission spectra determination algorithms, and (d) conditionally using said candidate reference emission spectra as the reference emission spectra in said spectral un-mixing.

For such a fluorescence analyzer according to an embodiment of the present invention and its further features and advantages, reference is made to the explanations in connection with the method and its modifications according to embodiments of the present invention.

The fluorescence analyzer may, according to an embodiment of the present invention, be configured to perform the procedure for determining and validating the reference emission spectra as including the further step of (i) performing a plausibility check for the candidate reference emission spectra between steps (c) and (d) indicated above, a result of the plausibility check indicating whether or not the candidate reference emission spectra are plausible for the fluorophores to be reconstructed, and a further step of (ii) using said candidate reference emission spectra as the reference emission spectra in said spectral un-mixing according to step (d) indicated above, if a result of the plausibility check is positive, or rejecting said candidate reference emission spectra if the plausibility check is negative. Again, as to specific further features according to embodiments of the present invention and of modifications thereof, reference is made to the explanations above.

A fluorescence analyzer according to an embodiment of the present invention comprises one or more processors and one or more storage devices adapted to render a graphical user interface configured to provide control widgets for at least one of triggering, entering parameters for, and evaluating results of, at least one of steps (a) to (e). A corresponding embodiment particularly improves user-friendliness.

The fluorescence analyzer, according to an embodiment of the present invention, may be configured to perform a method as explained in embodiments above, and therefore specific reference is made to the explanations above.

A fluorescence microscope configured to determine a mixed fluorescence response of a plurality of fluorophores in a microscopic sample is also provided. As to the fluorescence microscope, which comprises a fluorescence analyzer as mentioned above and, in an embodiment, a plurality of detectors and a plurality of light sources, reference is again made to the explanations above.

A computer program with program code for performing a method as explained in different aspects before when the computer program is run on a processor is also provided and likewise takes profits of the corresponding advantages.

In conventional fluorescence microscopy, filters are used to selectively capture a part of the fluorescence emission spectrum of a given fluorophore to increase specificity. However, if fluorescence responses of several fluorophores are to be captured in this situation, this classically requires switching the filter, which is generally slow and therefore disadvantageous, e.g. if a moving sample is observed.

More recently, also microscopes with different detection channels for different wavelength ranges became known. For example, EP 3 721 279 B1 discloses a microscope system comprising a detection unit adapted to detect fluorescence responses of fluorophores in different colour channels using a plurality of detectors. In such systems, which are also discussed below with reference to FIGS. 1 and 2, switching filters is no longer required to detect different colour channels separately.

Figure 1:
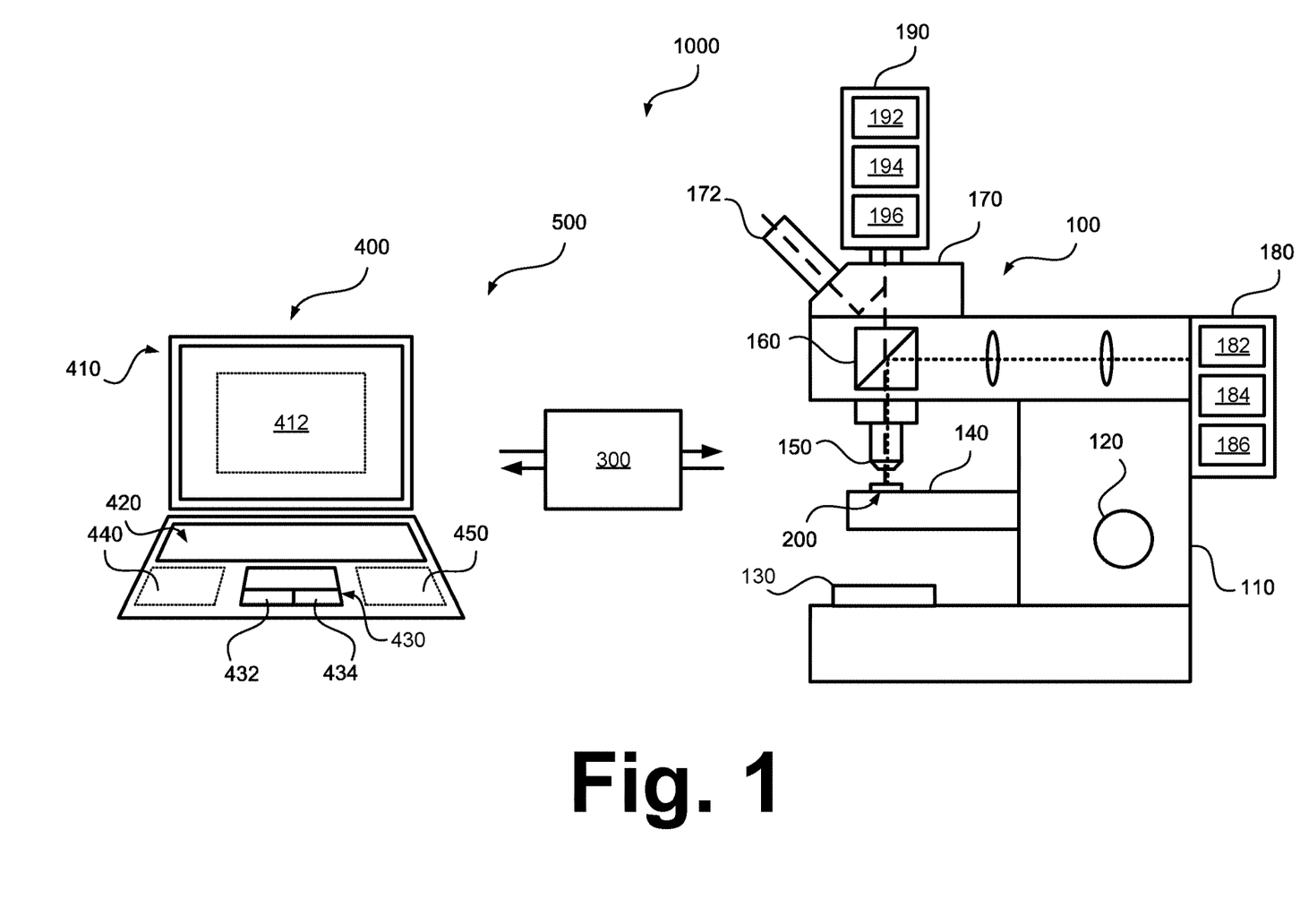
FIG. 1 illustrates a microscope system.
Figure 2:
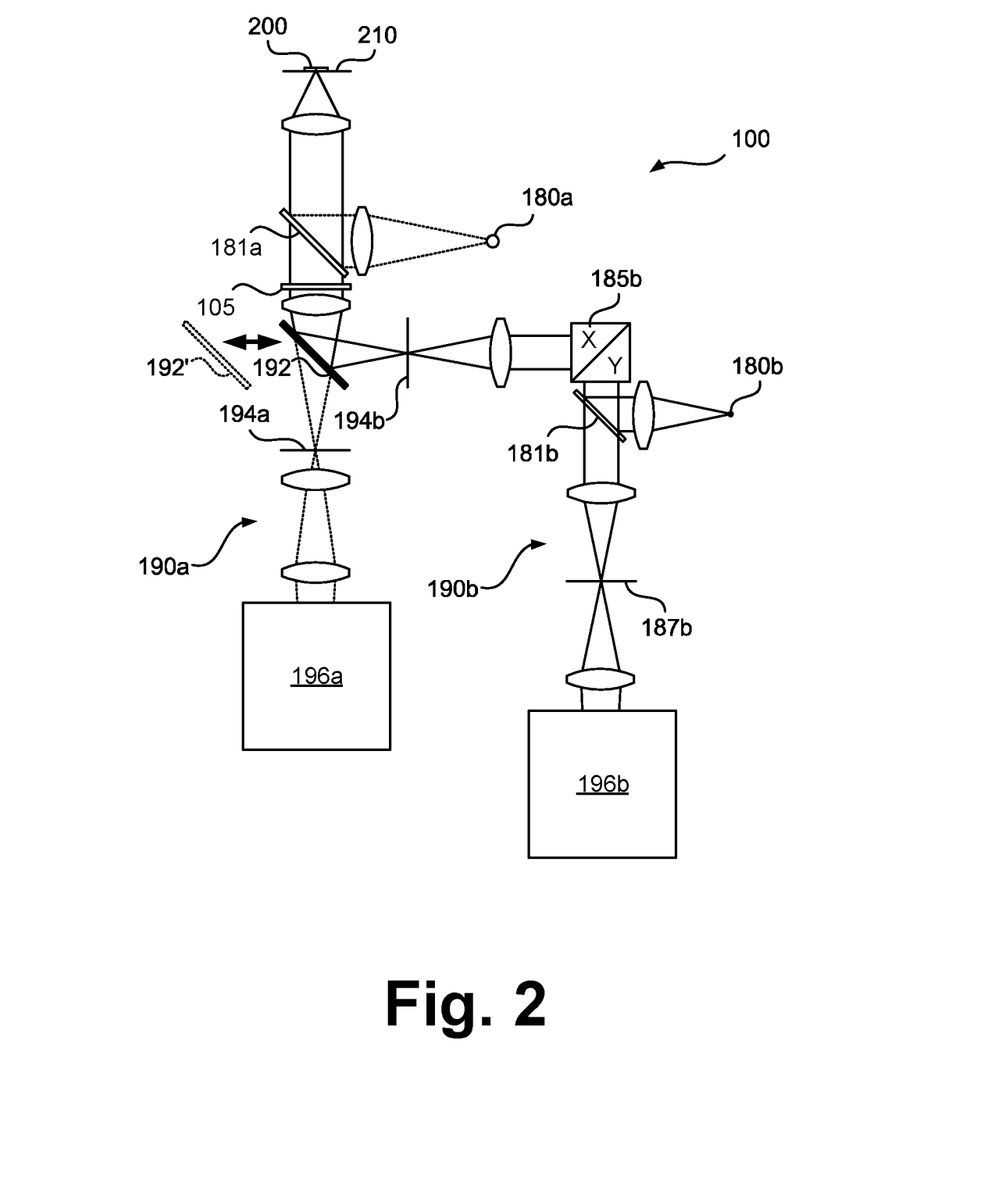
FIG. 2 illustrates aspects of a microscope.

Fluorescence microscopes which provide for a detection of different colour channels using different detectors may also be provided as systems which allow a user to select between different microscopy operation modes including, but not limited to, a wide-field, a confocal and a light-sheet operation mode. FIG. 1 illustrates a microscope system 1000 including such a microscope 100 in a more general way and FIG. 2 illustrates details of switching wide-field and confocal operation and the respective illumination and detection units in such a microscope 100. Be it noted, however, that embodiments of the present invention are not limited to be used in connection with either a microscope having different detection channels or a microscope operable in different microscopy operation modes.

Irrespective of whether filters or different detection channels are used, so-called cross-excitation and cross-emission may be observed. Cross-excitation is the phenomenon that a fluorophore with a certain excitation wavelength may to some extent also emit fluorescence when irradiated with excitation light of a different wavelength. Cross-emission is the effect of a fluorescence response typically not being a sharp peak at a certain wavelength but a spectrum, which may be detected to some extent in an adjacent channel. That is, using filters or different detection channels alone, a clear separation between fluorophores may not be possible. This is particularly the case when different fluorophores with relatively small differences in their respective excitation and emission wavelengths are used.

To tackle the problems of overlapping fluorophore emission, the un-mixing approaches already mentioned above have been developed. These generally enable the simultaneous imaging of multiple fluorophores. An overview is given e.g. by T. Zimmermann in an article entitled "Spectral Imaging and Linear Unmixing in Light Microscopy", Adv. Biochem. Eng. Biotechnol. (2005) 95: 245-265. In these un-mixing approaches, the spectral distribution of the "pure" fluorescence emission of a single fluorophore, such as detected by detectors (so-called "endmember spectra", or "reference emission spectra") is used to recover the spatial fluorophore abundances from multiple detector images or contributions of different fluorescence emissions. These reference emission spectra can be measured using control samples or calculated from literature values of fluorophore emission spectra and device sensitivity.

However, in such un-mixing methods, the quality of the un-mixing results will depend on how well the endmember spectra match the actual spectra of the fluorophores in the sample. The emission spectra of fluorophores are known to be variable, in particular depending on chemical environment, target proteins, illumination spectrum, or illumination history (i.e. particularly "bleaching" or photo-conversion effects). This variability can lead to sub-optimal un-mixing results, e.g. residual crosstalk between fluorophore channels.

Before specifically turning to solutions according to embodiments of the present invention, microscope systems which may be used in such embodiments will be described. As mentioned, FIG. 1 illustrates such a microscope system 1000. The microscope system 1000 may be configured to perform a method described herein. The microscope system 1000 comprises a microscope 100 and a computer system 400. The microscope 100 is configured to take images and is connected to the computer system 400 by means of a wired or wireless communication path or interface unit 300. The microscope 100 may be configured to be operated in different microscopy operation modes, e.g. a wide-field and a confocal operation mode as further illustrated with reference to FIG. 2. Even if FIG. 1 illustrates an upright microscope 100, embodiments of the present invention may be used with an inverted microscope, details of which are shown in FIG. 2, or any other geometrical arrangement of microscope. For example, components of a light-sheet microscope may be arranged horizontally.

The computer system 400 may be configured to execute at least a part of a method described herein. The computer system 400 and the microscope 100, as well as the interface unit 300, which is entirely optional, may be separate entities but can also be integrated together in one common housing. The computer system 400, even if illustrated as a laptop computer, may be part of a central processing system of the microscope 100 and/or the computer system 400 may be part of a subcomponent of the microscope 100, such as a sensor, an actor, a camera or an illumination unit, etc. of the microscope 100. Essentially the same holds true for interface unit 300.

The computer system 400 may be a local computer device (e.g. personal computer, laptop, tablet computer or mobile phone) with one or more processors 440 and one or more storage devices 450 or may be a distributed computer system (e.g. a cloud computing system with one or more processors and one or more storage devices distributed at various locations, for example at a local client and/or one or more remote server farms and/or data centers). The computer system 400 may comprise any circuit or combination of circuits.

In embodiments of the present invention, the computer system 400 may include the one or more processors 440 as being integrated into a housing of the computer system 100 in FIG. 1 without limitation. The processor(s) 440 can be of any type and can be provided in any number and at any position and in any component of the microscope system 1. As used herein, the term processor(s) may refer to any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), a multiple core processor, a field programmable gate array device (FPGA), for example, of microscope 100 or any component (e.g. of a camera) of the microscope system 1000 or any other type of processor or processing circuit. Other types of circuits that may be included in the computer system 400 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems.

The one or more storage devices 450 which the computer system 400 may include can comprise one or more memory elements suitable to the particular application, such as a main memory in the form of random access memory (RAM), one or more hard drives, and/or one or more drives that handle removable media such as compact disks (CD), flash memory cards, digital video disk (DVD), and the like.

The computer system 400 may also include a display device 410, one or more loudspeakers, a keyboard 420 and/or one or more user interaction devices, which can be or include a mouse or, as illustrated, a trackpad 430 with buttons 432 and 434, a trackball, a touch screen, a voice-recognition device, or any other device that permits a system user to input information into and receive information from, the computer system 400. As illustrated, the computer system 400 may be configured to render, on display device 410, a graphical user interface 412. The computer system 400 may further be configured to provide, via the keyboard and/or the trackpad 430 and/or any further input device, an interaction possibility with the graphical user interface 412 to operate the microscope system 1000.

The microscope 100 is shown to comprise, among others, a microscope housing 110, a focus adjustment knob 120, a transmitted light illumination 130, a stage 140 on which a sample 200 may be placed, at least one objective or lens 150, a dichroic unit 160, a tube 170 with an eyepiece or eyepiece set 172, an incident illumination unit 180 which is illustrated, without limitation, to comprise three different light sources 182 to 186 or illumination channels, and a camera or detection unit 190. The camera or detection unit 190 is shown to comprise, without limitation, three different detectors, cameras or detection channels 192 to 196, as further illustrated in connection with FIG. 2.

Light of illumination unit 190 is, as illustrated with a dotted line, coupled into a beam path, which is illustrated with a dashed line, with dichroic 160. Further components of an embodiment of a microscope 100 are shown in FIG. 2, as mentioned, and embodiments of the present invention are not limited by the specific configuration shown in FIGS. 1 and 2. The microscope may be, via a suitable switching of the light sources 182 to 186 or the illumination unit 180 and detection modalities in the detection unit 190, operable in different microscopy operation modes such as a wide-field and a confocal operation mode.

The computer system 400 and the interface unit 300 may be referred to as a microscope control arrangement 500, but this term, as used herein, is not limited by it comprising a computer 400 and an interface unit 300. The term "microscope control arrangement", as used herein, is particularly to be understood functionally and to refer to a unit or group of units comprising one or more processors 440 and one or more storage devices 450 provided in a computer system 400 or otherwise and e.g. being configured to render a graphical user interface 412 as described above and further illustrated below in embodiments.

FIG. 2, which will now be described before turning to the description of spectral un-mixing according to embodiments of the invention, illustrates parts of a fluorescence microscope 100 according to an embodiment of the present invention which can e.g. be used as the fluorescence microscope 100 in a microscope system 1 as illustrated in FIG. 1. Fluorescence microscope 100 as illustrated in FIG. 2 comprises two detection units, i.e. a first detection unit 190a and a second detection unit 190b. By means of a switchable or displaceable mirror 192 (as illustrated by a bidirectional arrow), or any other switching means, observation light may selectively be coupled in either the first detection unit 190a or the second detection unit 190b. In the position illustrated in FIG. 2, observation light is coupled via mirror 192 into the second detection unit 190b to the right. If mirror 192 is moved out of the position indicated, as illustrated with 192', the light path further proceeds to the bottom (in the embodiment illustrated) and thus observation light, as illustrated with dotted rim rays, is coupled into the first detection unit 190a. Optical lenses in an illumination and detection beam path are not specifically indicated. A blocking or excitation/emission filter, which may be provided in any way conceivable, is indicated 105.

The first detection unit 190a is, in the example shown in FIG. 2, a wide-field detection unit in which an image plane is indicated 194a. By using lenses not specifically indicated, the observation light is collimated and irradiated into a detector arrangement 196a in the first detection unit 190a. Detector arrangement 196a may be configured to split the observation light into different detection channels. As to a detector arrangement 196a usable in the first detection unit 190a, specific reference is made to the EP 3 721 279 B1, particularly to detection unit 10 as illustrated in FIG. 3 therein and the corresponding explanations, and the disclosure is incorporated by reference. An illumination unit for wide-field detection in the first detection unit 190a is illustrated in a simplified manner and indicated 180a. Its light may be coupled into an illumination beam path of the fluorescence microscope 100 in any way known in the art of microscopic illumination, such as using a dichroic mirror 181a.

The second detection unit 190b is, in the example shown in FIG. 2, a confocal detection unit in which an image plane is indicated 194b. A point light source 180b may be provided for confocal detection using confocal detection unit 190b. Point light source 180b may particularly be a (single) pinhole opening into which laser light may be focused, or an end of a light guide or fibre optics from which light emanates in a point-like manner. Point light source 180b is conjugated with an intermediate image plane 194b and an object plane 210 in the sample 200, such that illumination light may, via a dichroic mirror 181b or any other spectral beam splitting arrangement, such as an acousto-optical beam splitter, and illumination optics not specifically indicated, be focused to a point of the object plane 210 in a scanned manner using a X/Y scanner 185b which may be arranged in a tele-centric plane or a plane conjugated therewith. This allows for scanning the sample 200 in the sample plane 21, as generally known. A pinhole is indicated 187b. Again, for further details, specific reference is made to EP 3 721 279 B1, particularly to detection unit 20 as illustrated in FIG. 3 therein and the corresponding explanations, and the disclosure is incorporated by reference. The same applies for a detector arrangement 196b which may be configured to split the observation light into different detection channels. Also as to a detector arrangement 196b usable in the second detection unit 190b, reference is made to EP 3 721 279 B1, and the disclosure is incorporated by reference.

Spectral un-mixing techniques may be used in connection with fluorescence microscopy using fluorescence microscopes 100 as illustrated in FIGS. 1 and 2. Spectral un-mixing is a technique which, for example, tackles the problems of overlapping emission spectra of fluorophores as a result of cross-excitation or "bleed-through" between different detection channels such as those illustrated as detection channels 192 to 196 in FIG. 1. These phenomena, when not addressed properly, may lead to false-positive results. Corresponding problems become particularly pronounced when samples are labelled with three or more fluorophores, even if detection is performed in different channels 192 to 196.

Spectral un-mixing may particularly include linear un-mixing, non-negative matrix factorization, deconvolution, and principal component analysis. Un-mixing techniques may be based on a priori knowledge of emission spectra or may be used in connection with restricting the number of fluorophores to be the same or lower as the number of detection channels. At its core, and in the understanding as used herein, spectral un-mixing is a technique of decomposing mixed multichannel images into spectral signatures and abundances of each signature in each pixel.

Figure 3:
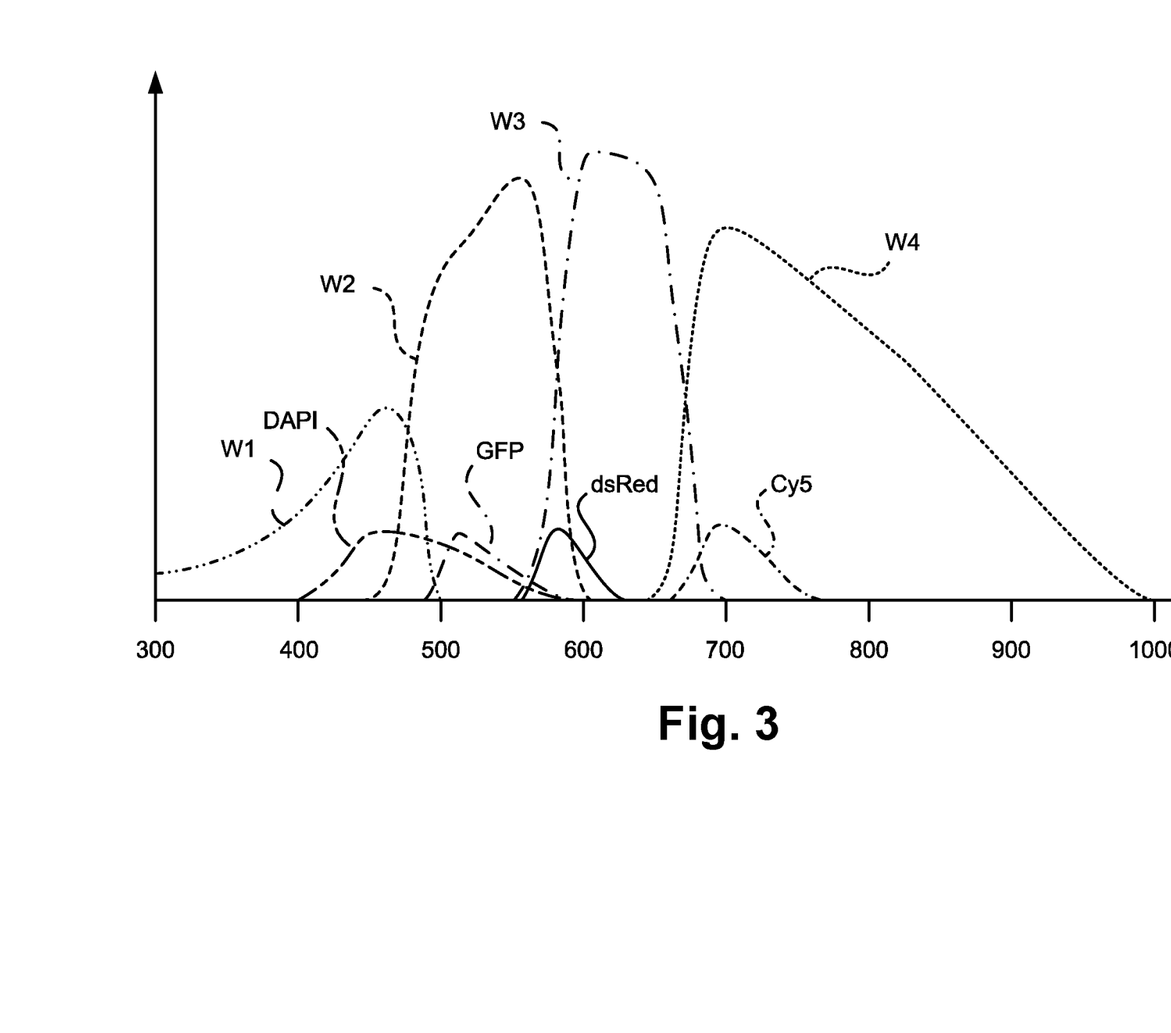
FIG. 3 illustrates aspects of fluorescence detection.
Figure 4:
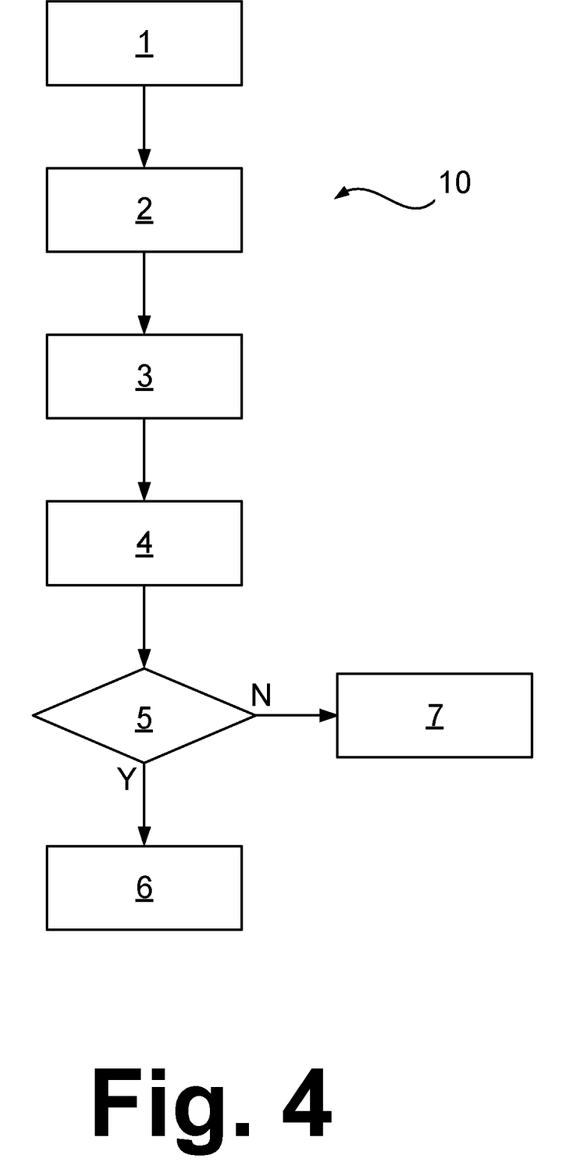
FIG. 4 illustrates a method according to an embodiment of the invention.

FIG. 3 illustrates the problems underlying embodiments of the present invention in which a detection in different detection channels such as detection channels 192 to 196 is performed using a colour beam splitter. In contrast to FIG. 1, the number of detection channels illustrated in FIG. 4 is four, but essentially the same problems are observed when any other number of detection channels is used. Embodiments of the present invention may be used with any number of detection channels. FIG. 3 shows a quantum efficiency diagram in which a quantum efficiency is plotted on the ordinate versus a wavelength in nanometres on the abscissa. W1, W2, W3 and W4 illustrate wavelength components which can be detected by the different spectral channels of a corresponding colour beam splitter arrangement, i.e. a colour "split" between different channels is approximately performed at a wavelength where the graphs shown for adjacent ones of the wavelength components W1, W2, W3 and W4 intersect. W1 denotes a blue channel, W2 denotes a green channel, W3 denotes an orange channel and W4 denotes a red channel.

The spectra of various fluorescent dyes are designated in FIG. 3 by their respective abbreviations known to those skilled in the art. As illustrated, while a fluorescence response of DAPI has a maximum in channel W1, a considerable proportion may still be detected in channel W2, where the maximum for GFP may be detected. This means that when a sample is stained with these fluorophores, they cannot be separated completely by using different detection channels but in channel W2 emission spectra overlap. In other words, DAPI considerably "bleeds" into channel W2 and an un-mixing is necessary. The fluorophore dsRed, for example, will be detected in approximately equal parts in channels W2 and W3 and therefore in these channels parts of its fluorescence response will be detected.

Generally, to enable spectral un-mixing, reference emission spectra can be directly measured in reference samples containing one and only one of the fluorophores of the sample of interest. This approach is, however, extremely time-consuming, as additional samples must be prepared by the user and subsequently measured. In addition, this approach is error-prone since it requires user intervention (for preparation of reference samples and definition of regions of interest) and does not consider variations between samples, which can occur even with careful sample preparation. The use of algorithms for the determination of reference emission spectra is currently not user-friendly, since usually multiple images (possibly with differing illumination settings and/or microscope settings) need to be acquired, kept track of, and used as input for the algorithms. In addition, the recovered spectra are not immediately useful, but must be entered manually into the un-mixing workflow. For this reason, such algorithms are often applied a posteriori and only by skilled users in conventional processes.

Methods according to embodiments of the present invention, which will now be described, however, enable a more reliable and user-friendly determination of the reference emission spectra used for spectral un-mixing of fluorescence microscopy images. This is achieved with minimal user intervention, by automatically acquiring the necessary images, performing the spectra determination, optionally checking the spectral determination for plausibility, and optionally giving feedback to the user regarding the outcome of the spectra determination. This method can be performed directly on the sample that is to be imaged afterwards, so that no additional reference samples are needed.

A method according to an embodiment of the present invention method is illustrated in FIG. 4, where it is shown in the form of a simplified flow diagram and designated 10. Method 10 is provided for analyzing a mixed fluorescence response of a plurality of fluorophores in a microscopic sample 200, wherein, as repeatedly mentioned, the mixed fluorescence response comprises contributions of individual fluorescence responses of each of the plurality of fluorophores. Reasons which may result in such a situation were already extensively explained before.

The method 10 includes reconstructing said individual fluorescence responses from the mixed fluorescence response using a spectral un-mixing on the basis of reference emission spectra for the fluorophores to be reconstructed. As mentioned, the determination of the reference emission spectra used for spectral un-mixing is performed in an advantageous manner according to embodiments of the present invention.

To this purpose, a procedure for determining and validating the reference emission spectra is provided according to an embodiment of the present invention whose steps will now be explained. Such a procedure may be initiated upon a corresponding request which may be a request by a user, according to an embodiment of the present invention, e.g. by pressing a button if the displayed image does not meet their expectations. A corresponding procedure can also be requested, according to an embodiment of the present invention, depending on the result of an image analysis, e.g. if the unmixed images have a large number of adjacent pixels with the same intensity, or if calculation of the correlation coefficient between unmixed images gives a value above a certain threshold. A corresponding request, or the step of processing, is illustrated 1 in FIG. 4.

In other words, said procedure for determining and validating the reference emission spectra may, according to an embodiment of the present invention, be performed as a response to a calibration request 1 which is at least one of a calibration request issued by a user, a calibration request issued on the basis of a result of an image analysis step, a calibration request issued on the basis of a predefined point in time and a calibration request issued when a change of a field of view is determined, and which may be issued, according to an embodiment of the invention, when the image analysis indicates that a number of adjacent pixels in a predetermined intensity range and/or a value corresponding to a correlation coefficient calculated between unmixed images is above a predetermined threshold.

In a next step 2, a determination as to a required sequence of images is made according to an embodiment of the present invention. In general, this will be a sequence with a certain illumination setting (e.g. an activated light emitting diode or an activated laser with given centre wavelength) per image. The number of entries in the sequence will in general be equal to the number of fluorophores in the sample or greater. In other words, step 2 may include, according to an embodiment of the present invention, providing a plurality of image acquisition settings for a sequence of images of the sample 200 which particularly may be equal to, or greater than, the plurality of fluorophores and including an illumination setting for each of the sequence of images.

The sequence of images may then in a step 3, according to an embodiment of the present invention, be acquired and stored together with the corresponding illumination settings. In other words, step 3 may include, according to an embodiment of the present invention, acquiring the sequence of images of the sample 200 using the plurality of image acquisition settings and storing each of the sequence of images of the sample 200 together with the corresponding illumination setting.

The illumination intensity of the illumination sources can preferably be set to previously determined optimum values, according to an embodiment of the present invention, or, in more general terms, said procedure for determining and validating the reference emission spectra may be performed in at least two instances in time including a previous and a subsequent instance, and the illumination settings used in the subsequent instance may be based on the illumination settings used in the previous instance particularly when a plausibility check, which will be discussed below, was positive in the previous instance.

If necessary, an automatic illumination intensity control step can be included, according to embodiments of the present invention, such as to provide illumination settings which are optimized in terms of response and sample protection.

An algorithm for determination of the endmember spectra from the acquired images may be run in a step 4, according to an embodiment of the present invention. Typical algorithms are N-FINDR, pixel purity index, nonnegative matrix or tensor factorization, or vertex component analysis. Furthermore, this algorithm can be performed by a trained neural network or any optimization algorithm. Again in more general terms, in an embodiment of the present invention, step 4 may include determining candidate reference emission spectra for the fluorophores to be reconstructed from the sequence of images of the sample 200 using one or more reference emission spectra determination algorithms.

In a step 5, which may form part of a method according to an embodiment of the present invention, a check for plausibility of the determined endmember spectra may be performed. A result of the plausibility check may indicate whether or not the candidate reference emission spectra are plausible for the fluorophores to be reconstructed. As illustrated with steps 6 and 7, said candidate reference emission spectra may either be used as the reference emission spectra in spectral un-mixing if a result of the plausibility check is positive, as illustrated with Y, or rejecting said candidate reference emission spectra if the plausibility check is negative, as illustrated with N.

A sensible check may be, according to an embodiment of the present invention, how much a determined endmember spectrum $S_{det}(\lambda_k)$ differs from the initial endmember spectrum $S_{init}(\lambda_k)$. Here, $\lambda_k$ gives the spectral position of the k-th spectral detector. This difference can be quantified, e.g. by the Euclidean distance $$d=\sqrt{\Sigma_k(S_{det}(\lambda_k)-S_{init}(\lambda_k))^2}$$

or by the spectral angle $$\theta = \cos^{-1}\left(\frac{\langle S_{det}(\lambda_k) \mid S_{init}(\lambda_k)\rangle}{|S_{det}(\lambda_k)| \cdot |S_{init}(\lambda_k)|}\right)$$

where $\langle\cdot|\cdot\rangle$ denotes the scalar product, and $|\cdot|$ a vector norm. A threshold value for ) the distance may be used.

Further checks used according to embodiments of the present invention may for example be checks for non-negativity ($S_{det}(\lambda_k) \geq 0$ for all $\lambda_k$) or for spectral separation of the determined candidate reference emission spectra (including for all such candidate reference emission spectra to be unique).

If the determined endmember spectra are found to be plausible, according to an embodiment of the present invention, they may be saved and used in future image acquisition for the un-mixing step, including for live imaging. This un-mixing step can be e.g. linear un-mixing, phasor un-mixing, a maximum-likelihood estimator or a hybrid approach. The saved endmember spectra can also be saved in the metadata of the captured images. In other words, performing the plausibility check in a subsequent instance already referred to above may include, in an embodiment of the present invention, performing an evaluation on the basis of reference emission spectra acquired in the previous instance and/or, when said result of performing the plausibility check is positive in the previous instance, said candidate reference emission spectra may, in an embodiment of the present invention, be stored for use in said plausibility check in said subsequent instance.

If the determined endmember spectra are not plausible, a feedback to the user may be given, in an embodiment of the present invention. For example, the user can be prompted to check if a given fluorophore is present in the imaged portion of the sample, if the sample contains additional fluorophores not specified, or if a wrong fluorophore was specified. The user may also be asked if the determined reference emission spectra should be used or not. In the simplest case, the initial reference emission spectra are used if the plausibility of the determined endmember spectra is not given.

In any case, and whether a plausibility check is performed or not, step 6 may include, in embodiments of the present invention, conditionally using said candidate reference emission spectra as the reference emission spectra in said spectral un-mixing.

Aspects of embodiments of the present invention, which were partially already explained before, may include that the spectral calibration may be automatically requested at fixed points in time (in particular while acquiring a series of images at different time points), in order to account for changes in the endmember spectra due to photo-bleaching, photo-conversion, changes in auto-fluorescence, changes in environmental conditions, etc. The spectral calibration may be automatically requested when the imaged field of view is changed, in order to account for changes in the endmember spectra due to spatial variations. The check for plausibility may use different thresholds depending on the fluorophore. In particular, if a given fluorophore is an auto-fluorescent species, the threshold may be chosen to be greater than for a non-auto-fluorescent species.

Many fluorophores are particularly sensitive to changes in the acidity of their surroundings, as measured by the pH value. If the change in spectral characteristics of a given fluorophore as a function of the pH value is known (or can be measured), the knowledge of the change of endmember spectrum of this fluorophore, e.g. as a function of time, can be used to measure changes in the pH value. This in turn can be used to control other aspects of the microscope, e.g. the environmental control (incubator), or to give feedback to the user, which is provided according to embodiments of the present invention. There are also physiological reasons that may lead to pH changes, so the identification of those changes might as well be subject of the user research and of embodiments of the present invention.

The method may be extended, according to an embodiment of the present invention, to not require knowledge of the initial spectra (e.g. through user input). Then, the number of spectra may be calculated from the data in the multiple images, e.g. with an algorithm such as the noise-whitened Harsanyi-Farrand-Chang method, and the initial endmember spectra given by an educated guess, e.g. Gaussian functions. Then, the determination of the endmember spectra follows the description given above.

Figure 5:
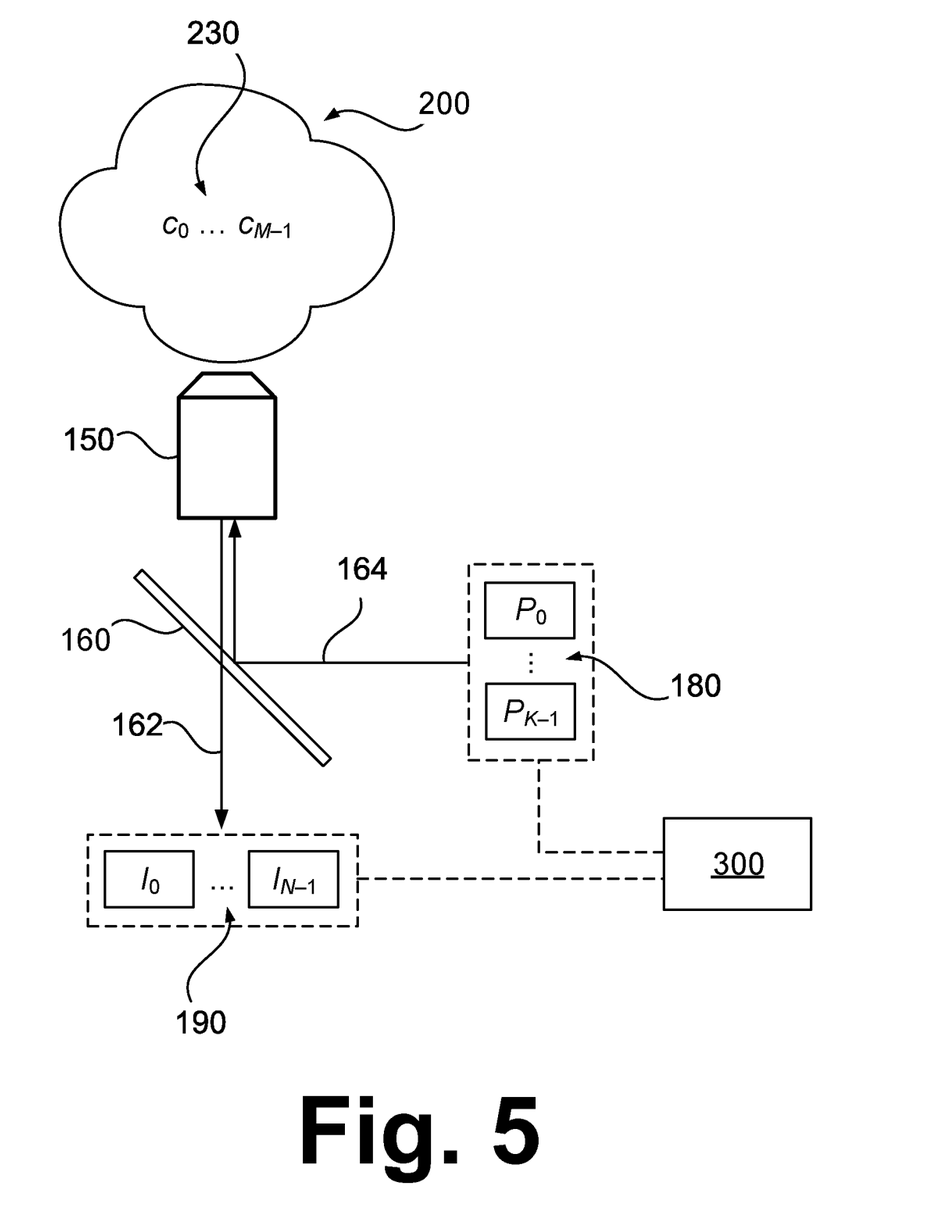
FIG. 5 illustrates further aspects of fluorescence detection.

Embodiments of the present invention may particularly be used in a fluorescence microscope with multiple illumination sources and multiple detectors with known spectral characteristics, as already described in embodiments in connection with FIGS. 1 and 2. Aspects are shown in connection with FIG. 5 where, as above, a fluorescence microscope is indicated 100 and a sample is indicated 200. Fluorophores of a number m=0, . . . , M−1 in the sample 200 are commonly referred to with 230, wherein c indicates their respective abundances. Illumination sources of a number k=0, . . . , K−1 are, as before, commonly referred to with 180, wherein P indicates their respective illumination power. Detection channels of a number n=0, . . . , N−1 are commonly referred to with 190, wherein I indicates the detection intensity. A detection path is referred to with 162, an illumination path with 164. For further details, reference is made to the explanations already given in connection with FIGS. 1 and 2 above.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may e.g. comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

10 Method
1 Calibration request
2 providing a plurality of image acquisition settings
3 Acquiring a sequence of images
4 determining candidate reference emission spectra
5 plausibility check
6 conditionally using candidate reference emission spectra
7 rejecting reference emission spectra
500 Microscope control arrangement
100 Microscope
105 Blocking filter
110 Microscope housing
120 Focus adjustment knob
130 Transmitted light illumination
140 Microscope stage
150 Microscope objective
160 Dichroic element
170 Microscope tube
172 Eyepiece set
180 Incident illumination unit
182-186 Light sources
180$a$, 180$b$ Wide-field and confocal illumination units
181$a$, 181$b$ Dichroic mirrors
185$b$ X/Y scanner
187$b$ Pinhole
190 Detection unit
192-196 Detectors, detection channels
190$a$, 190$b$ Wide-field and confocal detection units
192 Displaceable mirror
192' Displaced mirror position
194$a$, 194$b$ Wide-field and confocal image planes
196$a$, 196$b$ Wide-field and confocal detector arrangements
200 Sample
210 Object plane 300 Interface unit
400 Computer system
410 Display
420 Keyboard
430 Trackpad
432 First button
434 Second button
440 Processor(s)
450 Storage device(s)
1000 Microscope system
W1-W4 Detection channel spectra

The invention claimed is:

1. A method of analyzing a mixed fluorescence response of a plurality of fluorophores in a microscopic sample, wherein the mixed fluorescence response comprises contributions of individual fluorescence responses of each of the plurality of fluorophores, the method comprising:
reconstructing the individual fluorescence responses from the mixed fluorescence response using a spectral un-mixing on the basis of reference emission spectra for the fluorophores to be reconstructed, and wherein the method includes a procedure for determining and validating the reference emission spectra including the steps of:
a) providing a plurality of image acquisition settings for a sequence of images of the sample equal to, or greater than, the plurality of fluorophores and including an illumination setting for each image of the sequence of images,
b) acquiring the sequence of images of the sample using the plurality of image acquisition settings and storing each image of the sequence of images of the sample together with the corresponding illumination setting,
c) determining candidate reference emission spectra for the fluorophores to be reconstructed from the sequence of images of the sample using one or more reference emission spectra determination algorithms,
d) conditionally using the candidate reference emission spectra as the reference emission spectra in the spectral un-mixing, and
e) performing a plausibility check for the candidate reference emission spectra between steps c) and d), wherein performing the plausibility check includes performing an evaluation on the basis of the reference emission spectra.

2. The method according to claim 1, wherein a result of the plausibility check indicates whether or not the candidate reference emission spectra are plausible for the fluorophores to be reconstructed, and comprising the further step of:
using the candidate reference emission spectra as the reference emission spectra in the spectral un-mixing according to step d) if a result of the plausibility check is positive or rejecting the candidate reference emission spectra if the plausibility check is negative.

3. The method according to claim 1, wherein the illumination settings are linearly independent, and/or wherein the illumination setting for each image of the sequence of images includes a selection of a single light source among a plurality of light sources, the single light source including a light emitting diode, a laser of a given centre wavelength, or a wavelength selection device.

4. The method according to claim 1, wherein the procedure for determining and validating the reference emission spectra is performed in at least two instances in time including a previous and a subsequent instance.

5. The method according to claim 4, wherein a result of the plausibility check indicates whether or not the candidate reference emission spectra are plausible for the fluorophores to be reconstructed, and comprising the further step of:
using the candidate reference emission spectra as the reference emission spectra in the spectral un-mixing according to step d) if a result of the plausibility check is positive or rejecting the candidate reference emission spectra if the plausibility check is negative, wherein performing the plausibility check in the subsequent instance includes performing an evaluation on the basis of reference emission spectra acquired in the previous instance, and/or wherein, when the result of performing the plausibility check is positive in the previous instance, the candidate reference emission spectra are stored for use in the plausibility check in the subsequent instance, and/or wherein the illumination settings used in the subsequent instance are based on the illumination settings used in the previous instance when the plausibility check was positive in the previous instance.

6. The method according to claim 1, wherein the image acquisition settings include detector or camera settings selected on the basis of sample properties, the sample properties including at least one of a motility or sensitivity of the sample and the detector or camera settings including at least one of a binning factor, a scan speed, a scan resolution, a gain value and an exposure time.

7. The method according to claim 1, wherein the mixed fluorescence response is determined using a fluorescence microscope, wherein the fluorescence microscope is a fluorescence microscope configured to be operated in at least one microscopy mode selected from a wide-field mode, a confocal mode, and a light sheet mode, wherein the procedure for determining and validating the reference emission spectra is performed for at least one of the microscopy modes.

8. The method according to claim 1, wherein the procedure for determining and validating the reference emission spectra is performed as a response to a calibration request which is at least one of a calibration request issued by a user, a calibration request issued on the basis of a result of an image analysis step, a calibration request issued on the basis of a predefined point in time and a calibration request issued when a change of a field of view is determined.

9. The method according to claim 1, wherein reference excitation spectra are provided and used in determining the candidate reference emission spectra.

10. The method according to claim 1, wherein the plausibility check for the candidate reference emission spectra includes determining at least one of: a Euclidean distance from given reference emission spectra, a spectral angle with given reference emission spectra and a non-negativity for the candidate reference emission spectra.

11. The method according to claim 2, wherein the plausibility check includes comparing plausibility values with plausibility thresholds, wherein the plausibility thresholds are different for the fluorophores.

12. The method according to claim 1, wherein a value indicating a deviation of the candidate reference emission spectra from an expected value is used to derive a sample property, and/or wherein a number of the fluorophores and their spectra is derived from the mixed fluorescence response.

13. A fluorescence analyzer configured for analyzing a mixed fluorescence response of a plurality of fluorophores in a microscopic sample, wherein the mixed fluorescence response comprises contributions of individual fluorescence responses of the plurality of fluorophores, wherein the analyzing comprises reconstructing the individual fluorescence responses from the mixed fluorescence response using spectral un-mixing on the basis of reference emission spectra for the fluorophores to be reconstructed, and wherein the analyzer is configured for performing a procedure for determining and validating the reference emission spectra including the steps of:

a) providing a plurality of image acquisition settings for a sequence of images of the sample equal to, or greater than, the plurality of fluorophores and including an illumination setting for each image of the sequence of images, b) acquiring the sequence of images of the sample using the plurality of image acquisition settings and storing each image of the sequence of images of the sample together with the corresponding illumination setting, c) determining candidate reference emission spectra for the fluorophores to be reconstructed from the sequence of images of the sample using one or more reference emission spectra determination algorithms, d) conditionally using the candidate reference emission spectra as the reference emission spectra in the spectral un-mixing, and e) performing a plausibility check for the candidate reference emission spectra between steps c) and d), wherein performing the plausibility check includes performing an evaluation on the basis of the reference emission spectra.

14. The fluorescence analyzer according to claim 13, configured to perform the plausibility check, wherein a result of the plausibility check indicates whether or not the candidate reference emission spectra are plausible for the fluorophores to be reconstructed, and configured to perform the further step of:

using the candidate reference emission spectra as the reference emission spectra in the spectral un-mixing according to step d) if a result of the plausibility check is positive, or rejecting the candidate reference emission spectra if the plausibility check is negative.

15. A fluorescence microscope configured to determine a mixed fluorescence response of a plurality of fluorophores in a microscopic sample and comprising a fluorescence analyzer according to claim 13.

16. A computer program comprising instructions configured to perform a method according to claim 1.

17. The method according to claim 5, wherein the plausibility check for the candidate reference emission spectra includes determining at least one of: a Euclidean distance from given reference emission spectra, a spectral angle with given reference emission spectra and a non-negativity for the candidate reference emission spectra.

18. The method according to claim 1, wherein the plausibility check for the candidate reference emission spectra includes determining at least one of: a Euclidean distance from given reference emission spectra and a spectral angle with given reference emission spectra.

* * * * *